(12) United States Patent
Koller (10) Patent No.: US 8,051,608 B1
(45) Date of Patent: Nov. 8, 2011

(54) WIND TOWER TRANSPORT COVER

(75) Inventor: Eric J. Koller, Yankton, SD (US)

(73) Assignee: Shorma Company, Springfield, SD (US)

( * ) Notice: Subject to any disclaimer, the term of this patent is extended or adjusted under 35 U.S.C. 154(b) by 192 days.

(21) Appl. No.: 12/540,808

(22) Filed: Aug. 13, 2009

Related U.S. Application Data (60) Provisional application No. 61/088,560, filed on Aug. 13, 2008.

(51) Int. Cl.
*B63B 17/00* (2006.01)
*E04H 15/00* (2006.01)

(52) U.S. Cl. .......... 52/3; 52/4; 52/DIG. 12; 52/DIG. 13; 52/DIG. 14

(58) Field of Classification Search .......... 52/3–5, 52/746.1, DIG. 12, DIG. 13, DIG. 14; 296/141; 206/319; 150/154, 157–159, 161, 166; 53/134.1; 294/138, 152; 220/1.5
See application file for complete search history.

(56) References Cited

U.S. PATENT DOCUMENTS

| | | | | |
|---|---|---|---|---|
| 3,185,197 A * | 5/1965 | Spiro et al. | ...... | 150/154 |
| 4,098,536 A * | 7/1978 | Mills | ...... | 296/77.1 |
| 5,052,738 A * | 10/1991 | Li | ...... | 296/78.1 |
| 5,590,781 A * | 1/1997 | Shackelford et al. | ...... | 206/521 |
| 5,676,288 A * | 10/1997 | Spirk | ...... | 224/463 |
| 5,964,236 A * | 10/1999 | Berke | ...... | 135/87 |
| 6,129,408 A * | 10/2000 | Schultz et al. | ...... | 296/136.04 |
| 6,532,700 B1 * | 3/2003 | Maliszewski et al. | ...... | 52/40 |
| 6,837,006 B2 * | 1/2005 | Deskin | ...... | 52/3 |
| 6,869,125 B2 * | 3/2005 | Hamm | ...... | 296/83 |
| 6,916,059 B2 * | 7/2005 | Feinberg | ...... | 296/79 |
| 7,021,235 B1 * | 4/2006 | Nikjewicz-Larsen | ...... | 114/361 |
| 7,137,422 B2 * | 11/2006 | McMillen | ...... | 150/167 |

* cited by examiner

*Primary Examiner* — Brian Glessner
*Assistant Examiner* — Beth Stephan
(74) *Attorney, Agent, or Firm* — Dicke, Billig & Czaja, PLLC (57) ABSTRACT

A wind tower transport cover for covering an opening at an end of a wind tower section. The wind tower transport cover includes a main section and a packaging section. The main section is capable of substantially covering the opening at the end of the wind tower section. The packaging section extends from the main section. The packaging section is positionable in a storage configuration where the packaging section is substantially adjacent the main section and wherein the main section is positionable in a shipping configuration where the main section is at least partially within the packaging section.

18 Claims, 11 Drawing Sheets

WIND TOWER TRANSPORT COVER

This application claims priority to U.S. Provisional Application No. 61/088,560, which was filed on Aug. 13, 2008, the contents of which are incorporated herein by reference.

FIELD OF THE INVENTION

The invention relates generally to a protective cover. More particularly, the invention relates to a wind tower transport cover.

BACKGROUND OF THE INVENTION

When shipping various objects it may be necessary to protect a portion of the object from damage such as from environmental factors such as rain or snow. For relatively small objects, the objects may be placed in shipping containers. Larger objects may be placed into transport vehicles such as a truck or trailer that protects the object.

Even larger objects that may not fit into an enclosed transport vehicle may be partially covered such as with a tarp. One such class of relatively large objects that do not fit into conventional enclosed transport vehicles are components for wind towers that are used to generate electricity using the wind.

Because the wind towers are designed to withstand exposure to environmental factors, the external surfaces are not susceptible to damage from environmental factors such as rain or snow while the components of the wind tower are being transported to the use location.

However, because of the size of the wind towers that are used for large scale electricity generation, it is not possible to ship the wind towers in an assembled configuration. Rather, the wind tower is shipped in several components that are dimensioned to be transported using conventional transport vehicles such as semi trailers, which minimizes the need to obtain special permits or to adjust the transportation route because of size restrictions.

When the wind tower components are separated, there are interior regions of the wind tower components, which are exposed and thereby subject to damage from environmental factors. To minimize the potential of damage to the interior regions, protective covers are placed over the wind tower components. Because of the diameter of the wind tower components, the protective covers may have relatively large dimensions.

The protective covers must have sufficient strength to withstand the forces encountered as the wind tower components are transported to the use location. While these protective covers may be relatively expensive to manufacture, they heretofore have been discarded after the wind tower components are delivered.

SUMMARY OF THE INVENTION

An embodiment of the invention is directed to a wind tower transport cover that may be positioned in a use configuration or a shipping configuration. When in the use configuration, the wind tower transport cover may be placed over an end of a wind tower to protect the wind tower during transportation. When in the shipping configuration, the wind tower transport cover may be shipped to the originator without the use of additional packaging materials. Through this process the wind tower transportation cover may be reused.

The wind tower transport cover includes a main section and a packaging section. The main section is capable of substantially covering the opening at the end of the wind tower section. The packaging section extends from the main section. The packaging section is positionable in a storage configuration where the packaging section is substantially adjacent the main section and wherein the main section is positionable in a shipping configuration where the main section is at least partially within the packaging section.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 11 is a top view of an alternative configuration of the wind tower transport cover in an initial configuration.

DETAILED DESCRIPTION OF THE PREFERRED EMBODIMENTS

Figure 10:
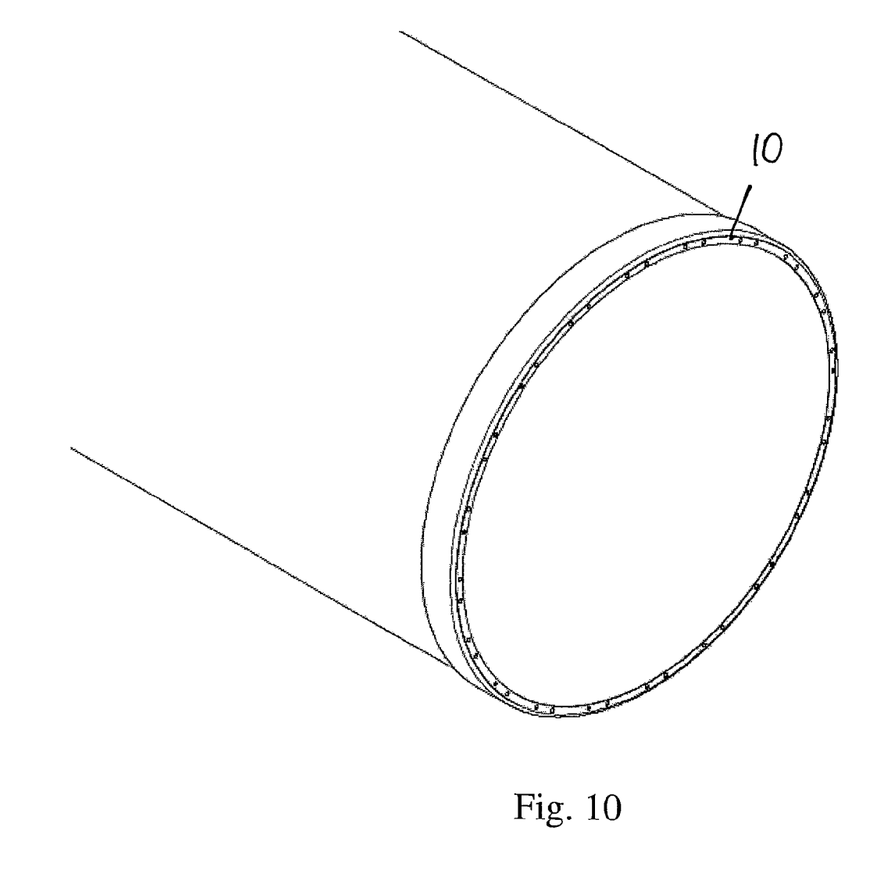
FIG. 10 is a view of the wind tower transport cover used in conjunction with a section of a wind tower.

An embodiment of the invention is directed to a wind tower transport cover, as illustrated at 10 in the figures. The wind tower transport cover 10 is particularly suited for use in conjunction with covering an open portion of a wind tower component, such as a wind tower section illustrated in FIG. 10 to thereby prevent damage of an interior portion of the wind tower component from exposure of the interior portion to environmental factors such as rain or snow.

The wind tower transport cover 10 may be fabricated from a variety of materials using the concepts of the invention. The material utilized to fabricate the wind tower transport cover 10 should have sufficient strength to resist damage when being used to cover the wind tower component as well as when being shipped. An example of one material that may be utilized for fabricating the wind tower transport cover 10 is a waterproof canvas.

The wind tower transport cover 10 generally includes a main section 20 and a packaging section 22. In certain embodiments, the main section 20 and the packaging section 22 are integrally formed such that the packing section 22 cannot be separated from the main section 20. The wind tower transport cover 10 may include a first side 30 (as illustrated in FIG. 1) and a second side 32 (as illustrated in FIG. 2).

Figure 1:
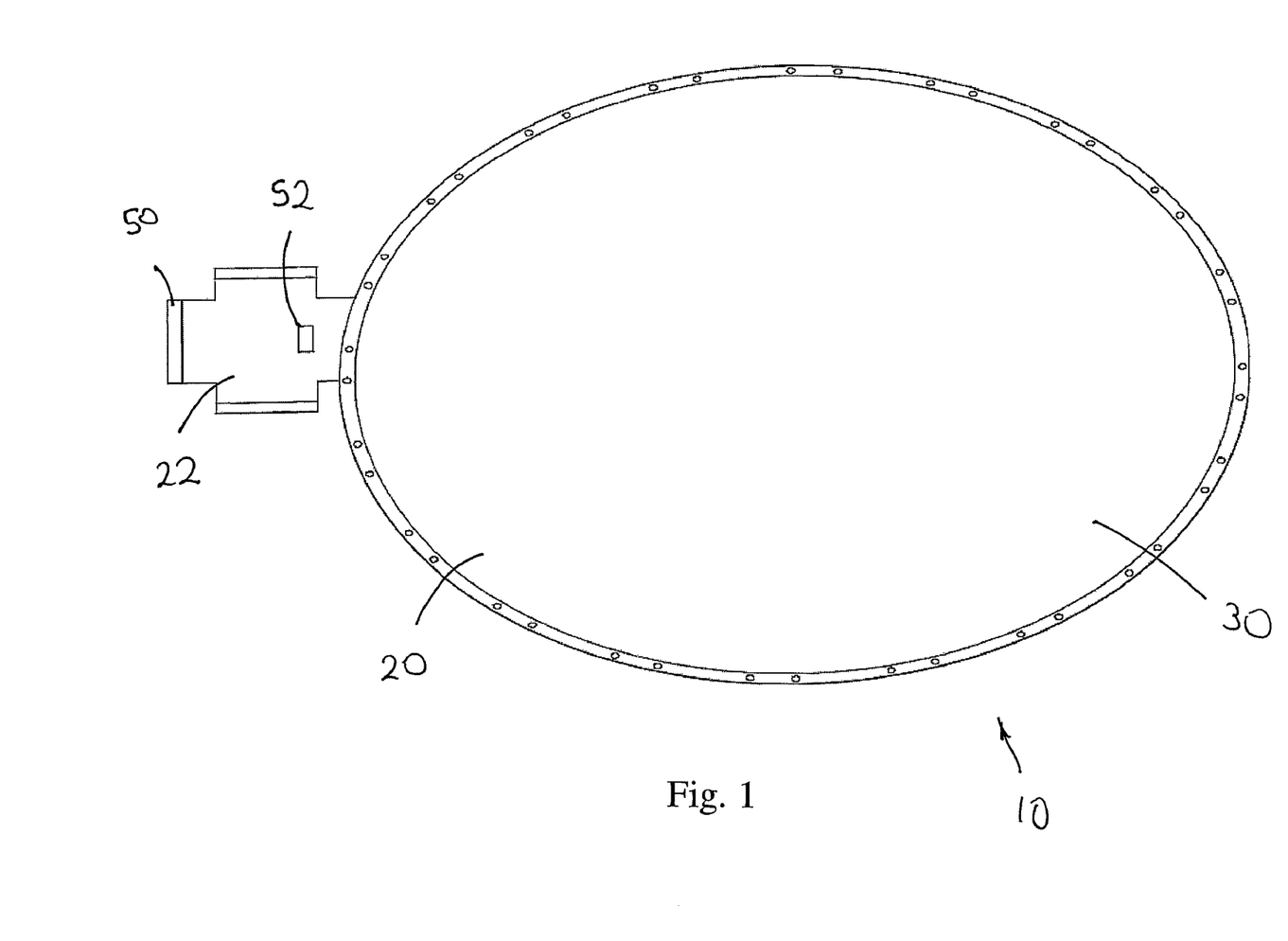
FIGS. 1 and 11 are each a top view of a wind tower transport cover in an initial configuration.
Figure 2:
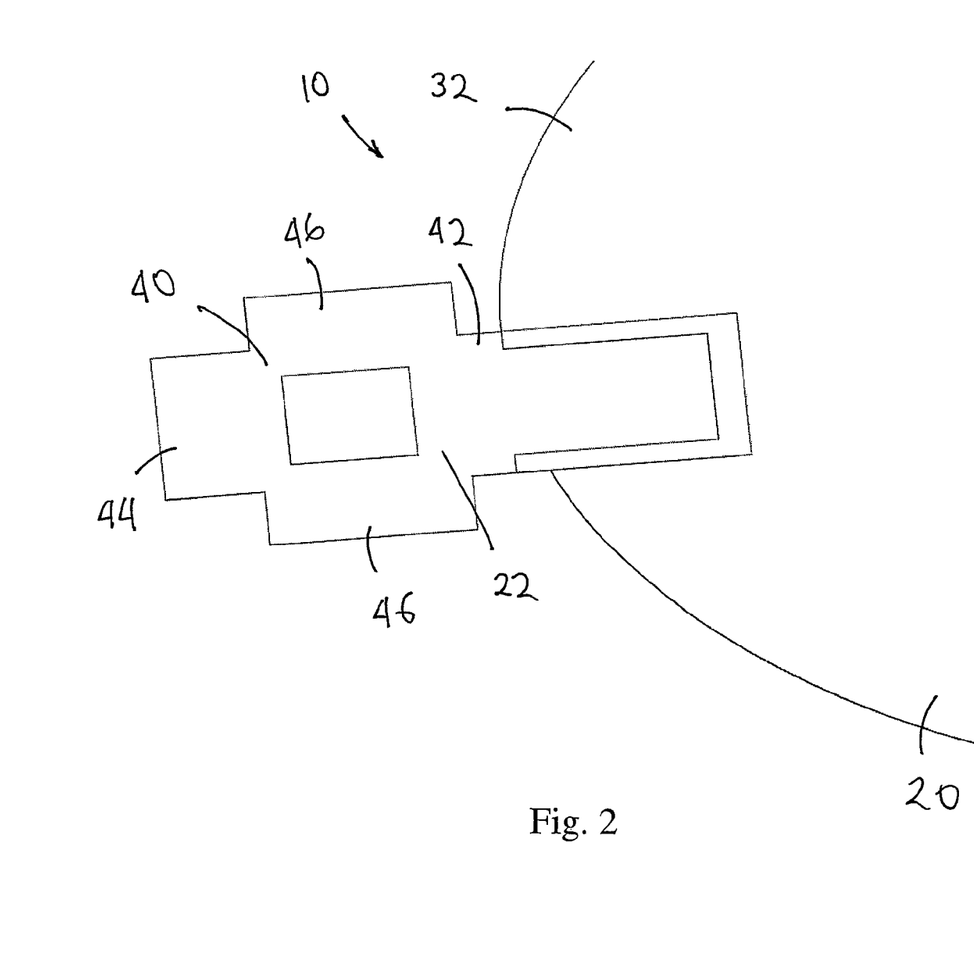
FIG. 2 is a bottom view of the wind tower transport cover in the initial configuration.

Depending on the folding pattern used for the main section 20, it is possible for the packaging section 22 to be attached to the main section 20 that is offset from a radius that extends from a center of the main section 20, as is illustrated in FIG. 1.

While the concepts of the invention are primarily described with respect to folding the main section 20 to reduce the size of the main section 20 so that the main section 20 will fit within the packaging section 22, it is possible to use other techniques to reduce the size of the main section 20. One such alternative technique is rolling of the main section 20. A person of skill in the art will appreciate that the concepts of rolling and folding may both be used.

The main section 20 is formed with a size and a shape that substantially conforms to a size and a shape of the portion of the wind tower component that is to be covered with the wind tower transport cover 10. In certain embodiments, the main section 20 may be substantially circular and have a diameter of between about 2 feet and about 20 feet.

The main section 20 may include components that facilitate attachment of the wind tower transport cover 10 to the wind tower component. In certain embodiments, the components utilized to facilitate attachment of the wind tower transport cover 10 to the wind tower component are grommets through which rope may be extended. Alternatively or additionally, it is possible to attach the wind tower transport cover 10 to the wind tower component using a strap that extends over an edge of the main section 20.

The main section 20 is folded when it is placed in the shipping configuration. To assist in folding the main section 20 in a size that is appropriate for forming the shipping configuration, the main section may include a plurality of lines printed thereon.

At least one of the main section 20 and the packaging section 22 may include instructions for correctly folding the main section 20 and/or instructions on the process for returning the wind tower transport cover 10 so that the wind tower transport cover 10 may be reused. To encourage the wind tower transport cover 10 to be returned, information about a reward or other compensation that encourages such return may be included on the main section 20.

At least one of the main section 20 and the packaging section 22 may include guide lines printed on a surface thereof that illustrate to the user the places at which the main section 20 and the packaging section 22 may be folded.

The packaging section 22 may include a central panel 40, a neck panel 42, an end panel 44 and a pair of side panels 46. The central panel 40 may have a generally rectangular shape that is defined by four edges. The neck panel 42 and the end panel 44 extend from opposite edges of the central panel 40. Similarly, each of the side panels 46 extend from opposite edges of the central panel 40.

A length and a width of the central panel 40, neck panel 42, the end panel 44 and the pair of side panels 46 is selected based upon the size of the main section 20 that must be retained in the shipping configuration. In certain embodiments, the length is between about 6 and 24 inches and the width is between about 4 and 10 inches.

On the first side 30 of the end panel 44 and the pair of side panels 46, a first fastening device 50 may be provided to facilitate forming the shipping configuration. Proximate the intersection of the central panel 40 and the neck panel 42, a second fastening device 52 may be utilized to facilitate forming the use configuration. In certain embodiments, the first fastening device 50 and the second fastening device 52 are a hook and loop fastener, a plurality of snaps, a zipper or combination thereof.

Figure 3:
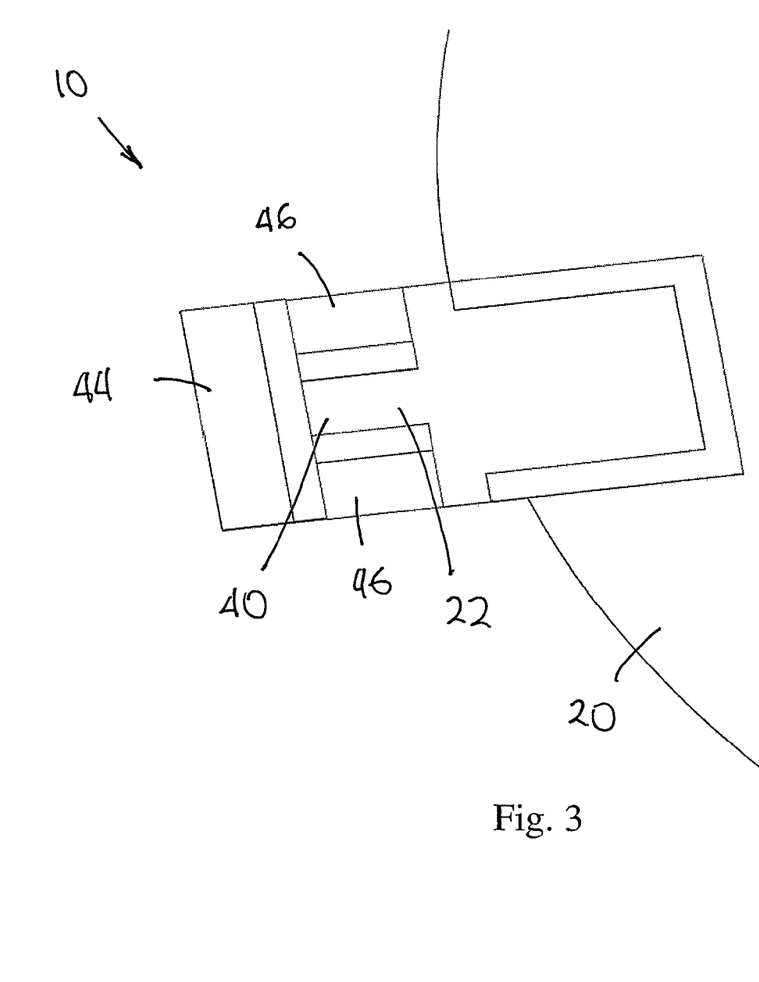
FIG. 3 is a bottom view of the wind tower transport cover in a first partially folded use configuration.
Figure 4:
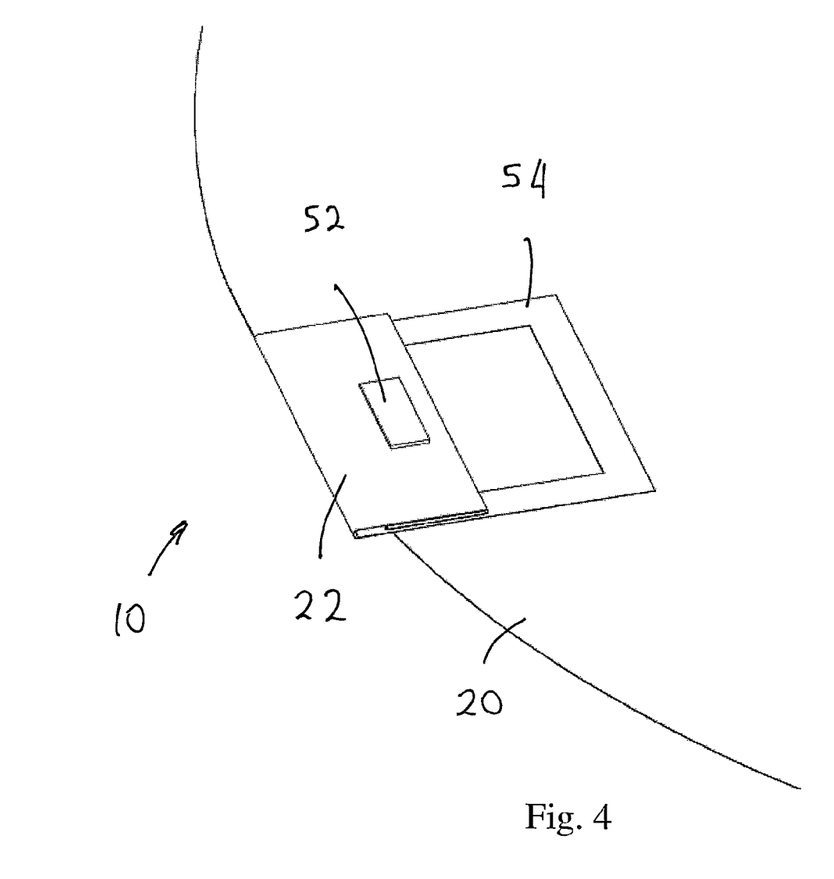
FIG. 4 is a bottom view of the wind tower transport cover in a second partially folded use configuration.
Figure 5:
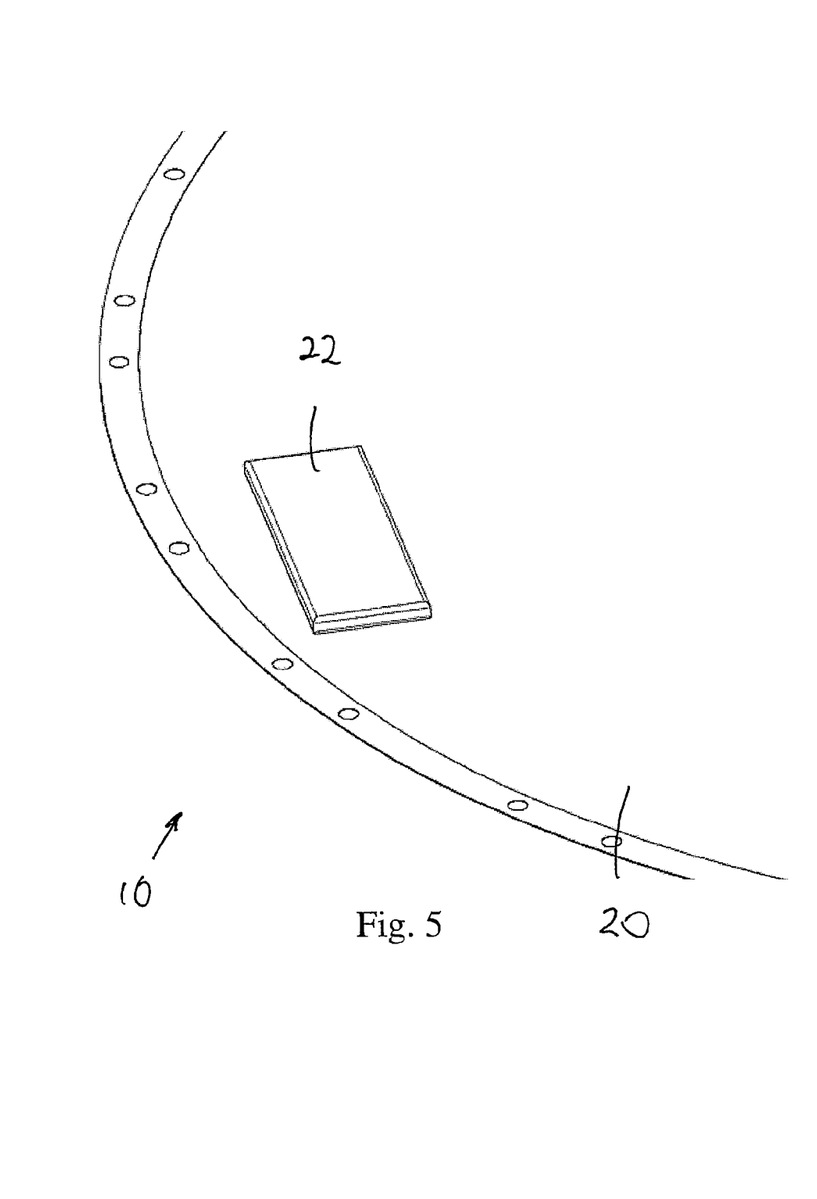
FIG. 5 is a bottom view of the wind tower transport cover in a use configuration.

To minimize potential damage to the wind tower component caused by contact with the packaging section 22, the packaging section 22 may be folded and then retained adjacent the main section 20. In certain embodiments, the end panel 44 and the pair of side panels 46 may be folded over the central panel 40, as illustrated in FIG. 3. The central panel 40 is then folded over, as illustrated in FIGS. 4 and 5, until the second fastening device 52 engages a complementary fastening device 54 on the main section 20. The packaging section 22 is thereby retained adjacent the main section 20.

When the wind tower component has been delivered to the desired location, the wind tower transport cover 10 is detached from the wind tower component and the packaging section 22 is unfolded so that the wind tower transport cover 10 is substantially flat, as illustrated in FIGS. 1 and 2.

Figure 6:
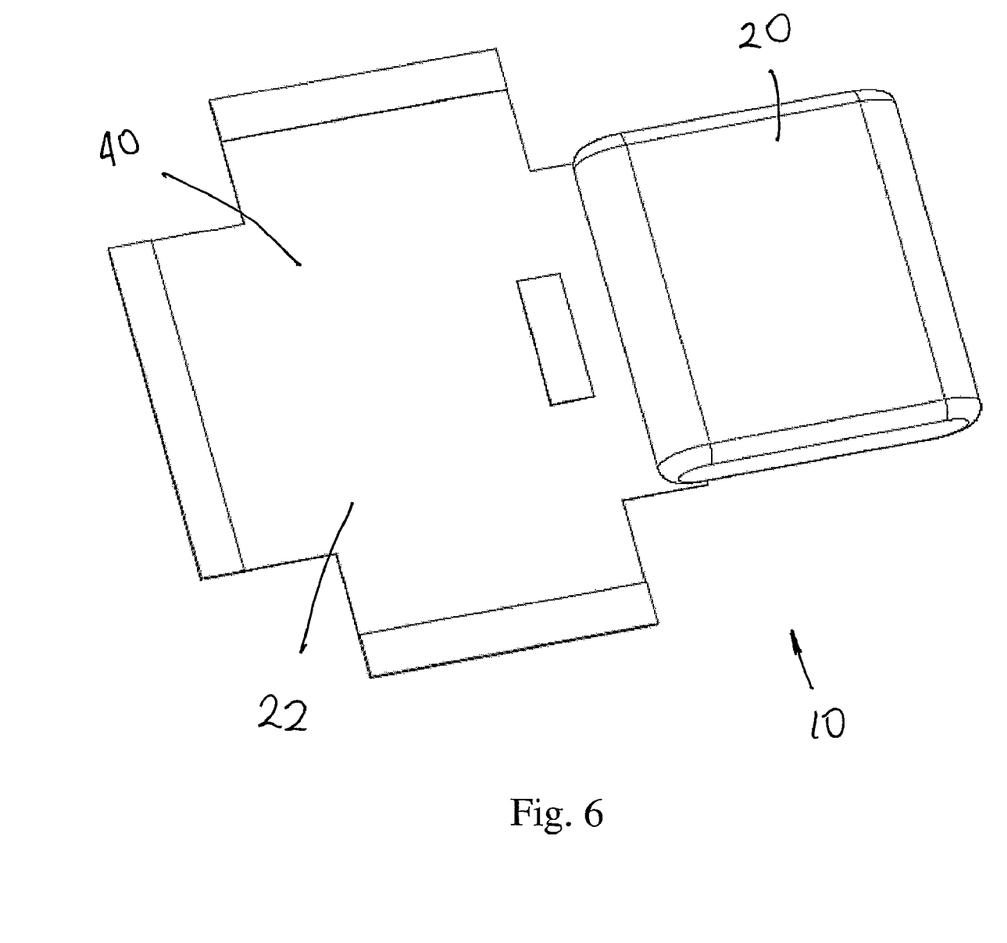
FIG. 6 is a top view of the wind tower transport cover in a first partially folded shipping configuration.
Figure 7:
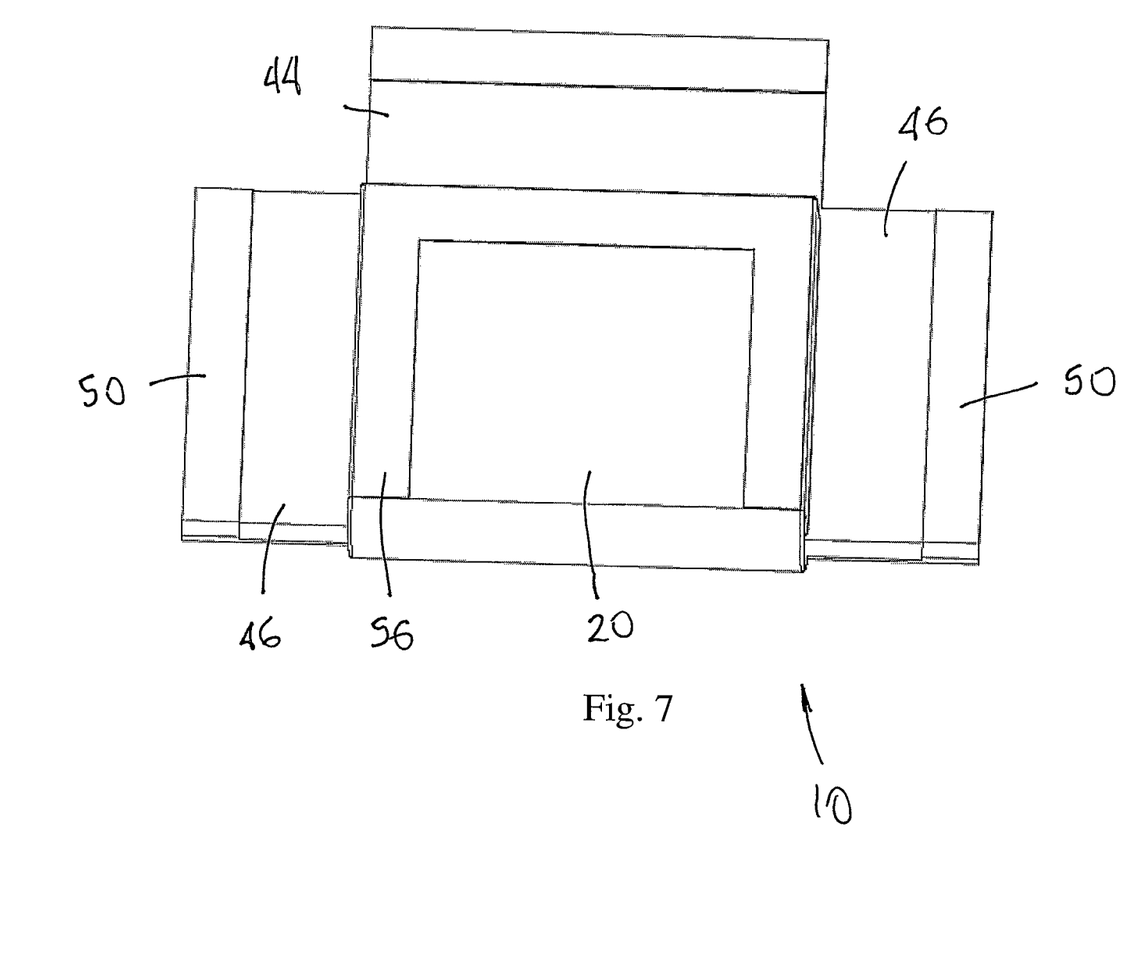
FIG. 7 is a top view of the wind tower transport cover in a second partially folded shipping configuration.

Thereafter, the wind tower transport cover 10 is positioned with the first side 30 up and the main section 20 is folded to provide a length and width that are approximately the same as the length and the width of the central panel 40, as illustrated in FIG. 6. The main section 20 is then folded over the central panel 40 so that the main section 20 is substantially above the central panel 40, as illustrated in FIG. 7.

Figure 8:
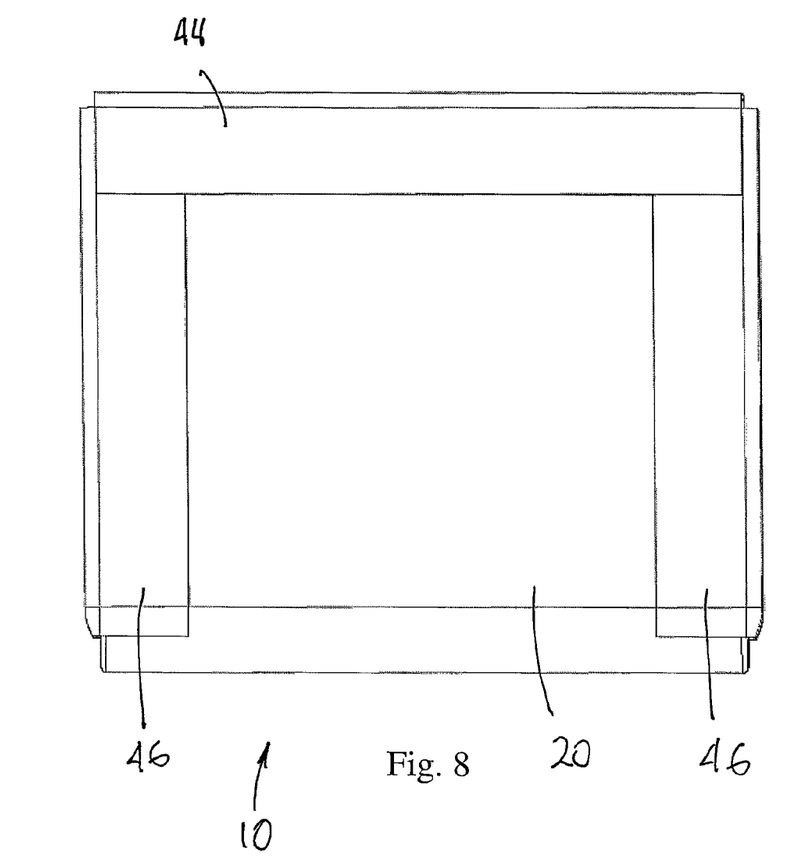
FIG. 8 is a top view of the wind tower transport cover in the shipping configuration.
Figure 9:
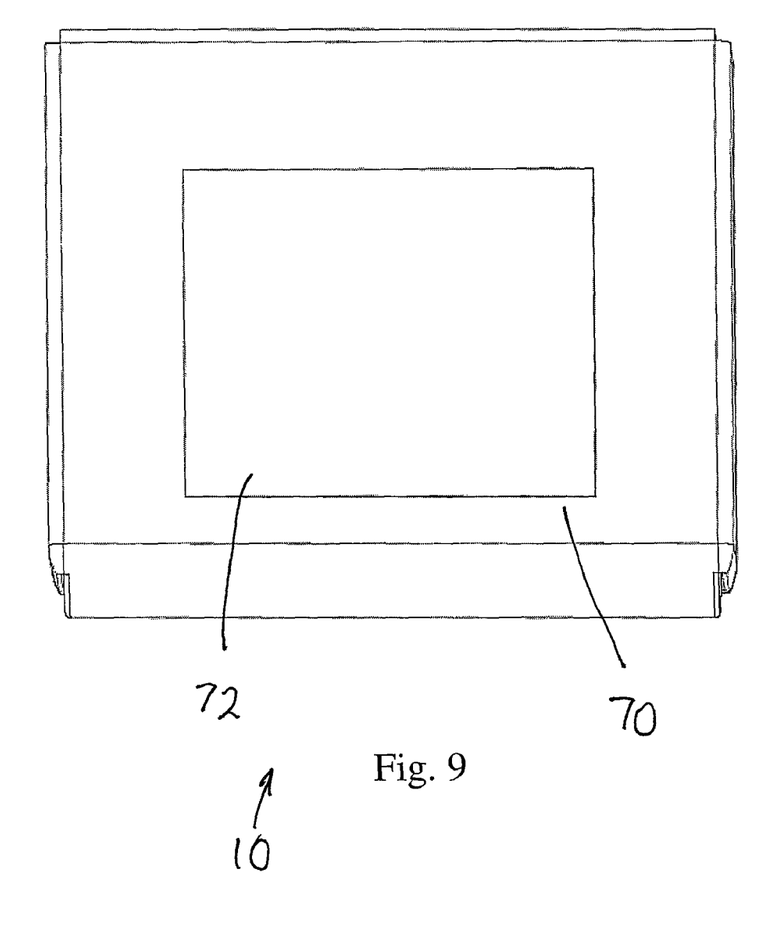
FIG. 9 is a bottom view of the wind tower transport cover in a shipping configuration.

The end panel 44 and the pair of side panels 46 are folded over main section 20 so that the first fastening device 50 engages a complementary fastening device 56 on the second side 32 of the main section 20. The wind tower transport cover 10 is thereby retained in the shipping configuration, as illustrated in FIG. 8.

To facilitate shipping the wind tower transport cover 10 in the shipping configuration, a pouch 70 may be provided on a surface of the wind tower transport cover 10. The pouch 70 may have a transparent region 72 to facilitate viewing shipping particulars that are placed in the pouch 70.

The pouch 70 thereby protects the shipping particulars from damage during the shipping process. The pouch 70 may also include an opening that facilitates placing and removing the shipping particulars from the pouch 70 such that the wind tower transport cover 10 can be reused on different locations. The opening may be configured to only permit access to the interior of the pouch 70 when the wind tower transport cover 10 is not in the shipping configuration.

Alternatively, the shipping particulars may be attached with an adhesive or the shipping particulars may be printed on a surface of the wind tower transport cover 10.

While the invention has been described as being suited for use in conjunction with protecting wind tower components during shipping, the concepts of the invention may be adapted for use in conjunction with other applications where the useful life of the transport cover is considerably greater than an initial use of the transport cover.

One criteria that may be used in selecting potential applications in which the protective cover may be used is that the size of the protective cover is relatively small such that when placed in the shipping configuration, the protective cover may be manually lifted.

Forming the protective cover in this manner enables the protective cover to be shipped back to the originator using conventional package delivery services such as the United State Postal Service, United Parcel Service and Federal Express, as opposed to being transported back to the originator on the transport vehicle that was utilized to deliver the wind tower component. Because of the nature of many commercial transport operations, the vehicle that is used to deliver the wind tower component to the use location does not return to the location where the wind tower component was fabricated.

In certain embodiments, the protective cover, when in the shipping configuration, may have a length, width and height that are each less than about 12 inches and the protective cover may have a weight of less than about 20 pounds.

Figure 11:
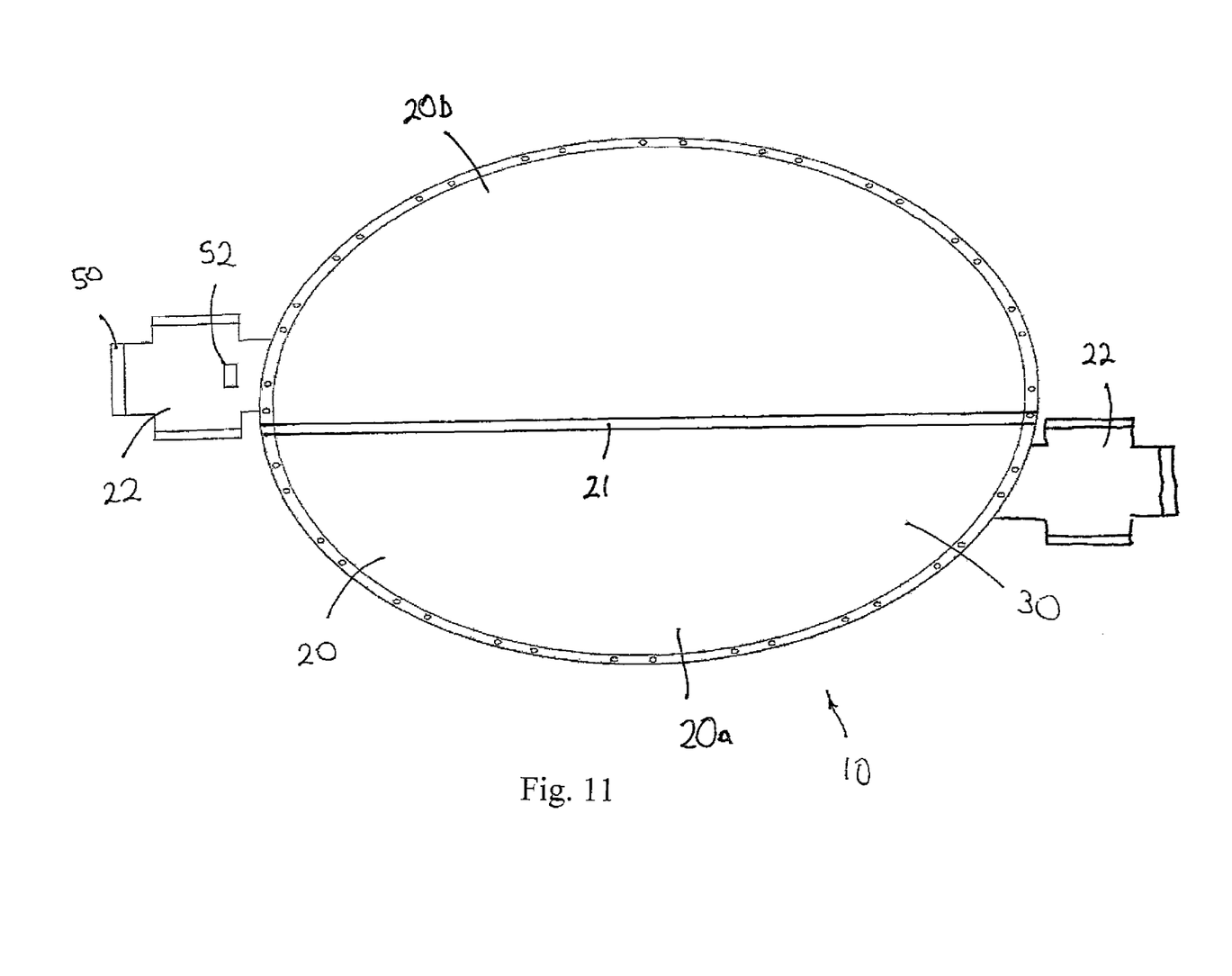

In situations where the protective cover is sufficiently large that it may be difficult to manually lift the protective cover, it is possible to form the protective cover in more than one section 20a, 20b that is retained together using a fastening system, examples of which include hook and loop fasteners, zippers and snaps 21, as illustrated in FIG. 11.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A wind tower transport cover for covering an opening at an end of a wind tower section, wherein the wind tower transport cover comprises:
   main section that is capable of substantially covering the opening at the end of the wind tower section, wherein the main section comprises a first fastening device; and
   packaging section extending from the main section, wherein the packaging section comprises a second fastening device, wherein the packaging section is positionable in a storage configuration where the first fastening device engages the second fastening device to retain the packaging section substantially adjacent the main section and wherein the main section is positionable in a shipping configuration where the main section is at least partially within the packaging section.

2. The wind tower transport cover of claim 1, wherein the main section has a substantially circular or oval shape.

3. The wind tower transport cover of claim 1, wherein the main section comprises at least one fastening mechanism for attaching the wind tower transport cover to the wind tower section and wherein the at least one fastening mechanism is located proximate an edge of the main section.

4. The wind tower transport cover of claim 1, wherein at least one of the main section and the packaging section includes associated therewith folding instructions, folding guide lines or combination thereof.

5. The wind tower transport cover of claim 1, wherein the main section is formed in at least two main section parts, wherein the at least two main section parts are attachable with a fastening mechanism and wherein each of the main section parts includes one of the packaging sections attached thereto.

6. The wind tower transport cover of claim 1, wherein the packaging section comprises:
   a central panel;
   a neck panel that interconnects the central panel and the main section;
   an end panel extending from the central panel opposite the neck panel; and
   at least one side panel extending from a side of the central panel intermediate the neck panel and the end panel.

7. The wind tower transport cover of claim 6, wherein the neck panel, the end panel and the at least one side panel are positionable generally perpendicular to the central panel to define a shipping recess and wherein the shipping recess is adapted to substantially receive the main section when in a folded configuration.

8. The wind tower transport cover of claim 6, wherein at least one of the end panel and the at least one side panel includes a fastening device for maintaining the wind tower transport cover in the shipping configuration.

9. The wind tower transport cover of claim 1, and further comprising a pouch mounted to a surface thereof, wherein the pouch is adapted to receive a mailing label.

10. A method of using a wind tower transport cover comprising:
    providing a wind tower transport cover having a main section and a packaging section that extends from the main section, wherein the main section comprises a first fastening device and wherein the packaging section comprises a second fastening device;
    providing a section of a wind tower having an opening proximate an end thereof;
    positioning the packaging section in a storage configuration with respect to the main section where the first fastening device engages the second fastening device;
    positioning the main section so that the main section substantially covers the opening;
    folding the main section; and
    positioning the folded main section at least partially within the packaging section so that the wind tower transport cover is in a shipping configuration.

11. The method of claim 10, wherein the main section has a substantially circular or oval shape.

12. The method of claim 10, and further comprising attaching the wind tower transport cover to the wind tower section with at least one fastening mechanism.

13. The method of claim 10, and further comprising maintaining the wind tower transport cover in the shipping configuration with a fastening mechanism.

14. The method of claim 10, and further comprising shipping the wind tower transport cover in the shipping configuration using a common carrier without placing the wind tower transport cover in a shipping container.

15. The method of claim 10, and further comprising providing folding instructions, folding guide lines or combination thereof on at least one of the main section and the packaging section.

16. The method of claim 10, and further comprising forming the packaging section having a central panel, a neck panel that interconnects the central panel and the main section, an end panel extending from the central panel opposite the neck panel, and at least one side panel extending from a side of the central panel intermediate the neck panel and the end panel.

17. The method of claim 16, and further comprising positioning the neck panel, the end panel and the at least one side panel generally perpendicular to the central panel to define a shipping recess and wherein the shipping recess is adapted to substantially receive the main section when in a folded configuration.

18. The method of claim 10, wherein wind tower transport cover includes a pouch attached to a surface thereof and wherein the pouch includes shipping details for a recipient of the wind tower transport cover.

* * * * *